Figure 1:
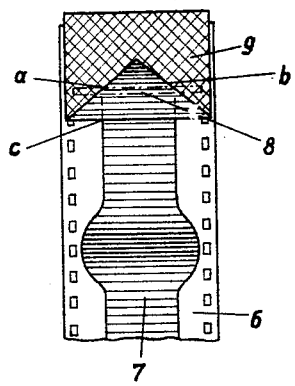

Nov. 29, 1932.   S. A. BERGLUND   1,889,627
METHOD OF AND APPARATUS FOR MAKING PHOTOPHONOGRAMS
Filed Feb. 27, 1930

Inventor:
SVEN A:SON BERGLUND
by:
Knight Bros.
Attorneys

Patented Nov. 29, 1932

1,889,627

UNITED STATES PATENT OFFICE

SVEN A: SON BERGLUND, OF BERLIN-LANKWITZ, GERMANY, ASSIGNOR TO N. V. KUCHEN-MEISTERS INTERNATIONALE MAATSCHAPPIJ VOOR SPREKENDE FILMS, OF AMSTERDAM, NETHERLANDS

METHOD OF AND APPARATUS FOR MAKING PHOTOPHONOGRAMS

Application filed February 27, 1930, Serial No. 431,940, and in Germany November 29, 1928.

My invention relates to method of, and apparatus for, making photo-phonograms with sources of light the radiation of which is influenced by controlled relays.

It is an object of my invention to improve the method and apparatus for this purpose and to this end I influence the intensity of light rays which are controlled as to their direction, so as to obtain on a sensitive layer pictures of various size and density.

It has already been proposed to mark intensity curves, for instance, tone curves, on a sensitive film or other layer which is moved past a gap, and to influence the light rays, for instance, by opaque diaphragms of definite form arranged in the path of the light rays. The bundle of light rays may be so controlled by mechanical or electric means that the picture of the diaphragm oscillates in parallel relation to the direction in which the film is moving. Through a gap, a picture is made on the sensitive layer which is bordered by more or less defined curves.

It has also been proposed to control the intensity of a source of light by sound waves and to obtain a photogram of varying density.

The problem of improving the existing methods may be solved in various ways.

Thus, I may provide a source of light which is controlled as to its intensity by sound waves, and the radiation of which is reflected to the sensitive layer by a mirror under the control of the same sound waves. In this manner a mark of variable density and bordered by curves is obtained.

On the other hand, I may control the radiation of a source of light the intensity of which is influenced, by providing a diaphragm which is moved in parallel relation to the movement of the film at the rhythm of the sound waves.

In the latter case I may provide a source of light with constant intensity, the slot in the diaphragm being shaded so as to gradually change from a perfectly opaque part to a transparent part, the form and shading of the diaphragm being as desired.

In the accompanying drawing, an example of the subject matter of my invention is illustrated.

Figure 2:
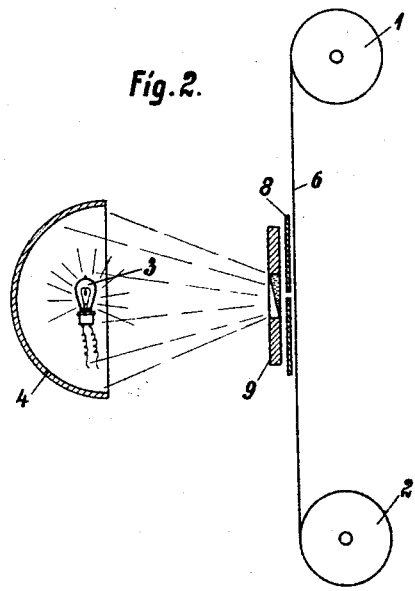

In the drawing,

Fig. 1 shows a diaphragm according to the invention with a sound record produced thereby, and Fig. 2 shows the assembly in which the diaphragm of the invention is employed.

Referring now to Fig. 1, the diaphragm 9 comprises an opaque part and a triangular part $a$, $b$, $c$ of varying transparency. The density of the latter part increases from the base $c$ thereof to its apex, at which point the same is quite opaque.

A photographic film 6 passes between reels 1 and 2 (Fig. 2), and a source of light 3 is concentrated by means of reflector 4 upon the composite diaphragm element 9. A screen 8 having a slot or light aperture corresponding to the width of the film is disposed between the film and the diaphragm 9. This slot permits the passage of a light ray controlled in length and intensity by the varying position of diaphragm 9 with respect to the slot. By thus shading the diaphragm, the mark 7 of the sound waves not only is of variable width but is also of variable density. When the mark becomes wider the darkening becomes more intense, and where it is reduced in width the darkening is diminished.

I claim:

1. In an apparatus for the production of photographic sound records of variable form and intensity upon a film, a diaphragm with an opening adapted to move in the direction of film travel under the control of sound waves, a body in said opening the transparency of which varies in the direction in which said diaphragm moves, a light source on the side of said diaphragm opposite to that facing the film, and a fixed diaphragm with a light aperture extending across the width of the film between said light source and the film.

2. In an apparatus for the production of photographic sound records of variable form and intensity upon a film, a diaphragm with an opening having sides inclined to the direction of film travel and adapted to move in this direction under the control of sound waves, a body in said opening the transparency of which varies in the direction in which said diaphragm moves, a light source on the side of said diaphragm opposite to that facing the film, and a fixed diaphragm with a light aperture extending across the width of the film between said light source and the film.

In testimony whereof I affix my signature.

SVEN A:SON BERGLUND.